United States Patent
Qi et al.

(10) Patent No.: US 11,385,380 B2
(45) Date of Patent: Jul. 12, 2022

(54) SYSTEM AND METHOD FOR DEBUGGING MILLIMETER WAVE SECURITY INSPECTION INSTRUMENT

(71) Applicants: CHINA COMMUNICATION TECHNOLOGY CO., LTD, Shenzhen (CN); SHENZHEN INSTITUTE OF TERAHERTZ TECHNOLOGY AND INNOVATION CO., LTD, Shenzhen (CN)

(72) Inventors: Chunchao Qi, Shenzhen (CN); Chao Sun, Shenzhen (CN); Shukai Zhao, Shenzhen (CN); Guangsheng Wu, Shenzhen (CN); Qing Ding, Shenzhen (CN)

(73) Assignees: CHINA COMMUNICATION TECHNOLOGY CO., LTD., Shenzhen (CN); SHENZHEN INSTITUTE OF TERAHERTZ TECHNOLOGY AND INNOVATION CO., LTD., Shenzhen (CN)

( * ) Notice: Subject to any disclaimer, the term of this patent is extended or adjusted under 35 U.S.C. 154(b) by 772 days.

(21) Appl. No.: 16/315,582

(22) PCT Filed: Jul. 6, 2017

(86) PCT No.: PCT/CN2017/092071
§ 371 (c)(1),
(2) Date: Apr. 3, 2019

(87) PCT Pub. No.: WO2018/006854
PCT Pub. Date: Jan. 11, 2018

(65) Prior Publication Data
US 2019/0227190 A1   Jul. 25, 2019

(30) Foreign Application Priority Data
Jul. 6, 2016 (CN) .............. 201610528243

(51) Int. Cl.
*G01V 13/00* (2006.01)
*G01S 13/89* (2006.01)
*G01V 8/10* (2006.01)

(52) U.S. Cl.
CPC .............. *G01V 13/00* (2013.01); *G01S 13/89* (2013.01); *G01V 8/10* (2013.01)

(58) Field of Classification Search
CPC ........... G01V 13/00; G01V 8/10; G01S 13/89
See application file for complete search history.

(56) References Cited

U.S. PATENT DOCUMENTS

2004/0184382 A1* 9/2004 Horimai ................. G11B 7/007
2008/0143528 A1* 6/2008 Haberl ..................... G01V 8/14
340/556

(Continued)

FOREIGN PATENT DOCUMENTS

CN   102135610   7/2011
CN   102495396   6/2012
(Continued)

OTHER PUBLICATIONS

Sang Wei et al., "Application of millimeter wave imaging technology in human safety inspection", Journal: China Security & Protection, vol. 2013, (4), 6 pages.

*Primary Examiner* — Natalie Huls
*Assistant Examiner* — Sharad Timilsina
(74) *Attorney, Agent, or Firm* — Jason P. Mueller; FisherBroyles, LLP

(57) ABSTRACT

A millimeter wave security inspection instrument debugging system and a millimeter wave security inspection instrument debugging method, which are used for debugging the imaging definition of a millimeter wave holographic imaging security inspection system. A main control apparatus is used for generating a millimeter wave detection signal and a reference signal. The main control apparatus is also used for, where a millimeter wave transmitting antenna, a millimeter wave receiving antenna and a detected object are respectively located at different relative positions, transmitting the millimeter wave detection signal to the detected object by means of the millimeter wave transmitting antenna, and receiving an echo signal reflected from the detected object by means of the millimeter wave receiving antenna, and then using a holographic image technique to perform three-dimensional imaging according to the reference signal and (Continued)

the echo signal. The main control apparatus can finally obtain a plurality of three-dimensional imaging results, so that the optimal relative positions of the millimeter wave transmitting antenna, the millimeter wave receiving antenna and the detected object can be determined, which results are applied to a millimeter wave holographic imaging security inspection system, thereby improving the imaging definition of the millimeter wave holographic imaging security inspection system.

9 Claims, 5 Drawing Sheets

(56) References Cited

U.S. PATENT DOCUMENTS

| | | | | |
|---|---|---|---|---|
| 2008/0158045 A1* | 7/2008 | Teranishi | ............... | B60Q 1/076 |
| | | | | 342/70 |
| 2015/0048251 A1* | 2/2015 | Chen | ...................... | G01N 22/00 |
| | | | | 250/349 |

FOREIGN PATENT DOCUMENTS

| | | | |
|---|---|---|---|
| CN | 102508240 | | 6/2012 |
| CN | 102508240 A | * | 6/2012 |
| CN | 102495435 B | | 10/2013 |
| CN | 105510912 | | 4/2016 |
| CN | 105607056 | | 5/2016 |
| CN | 105699494 | | 6/2016 |
| CN | 105938206 | | 9/2016 |
| WO | 2009053960 | | 4/2009 |

* cited by examiner

SYSTEM AND METHOD FOR DEBUGGING MILLIMETER WAVE SECURITY INSPECTION INSTRUMENT

PRIORITY INFORMATION

This application is a national stage entry under 35 U.S.C. 371 of PCT Patent Application No. PCT/CN2017/092071, filed Jul. 6, 2017, which claims priority to Chinese Patent Application No. 201610528243.1, filed Jul. 6, 2016, the entire contents of each of which are incorporated herein by reference.

TECHNICAL FIELD

Embodiments of the present disclosure relate to the technical field of human body security inspection, and more particularly, to a millimeter wave security inspection instrument debugging system and a millimeter wave security inspection instrument debugging method.

BACKGROUND

Millimeter wave's frequency is between 30 GHz to 300 GHz (with the wavelength from 1 mm to 10 mm). In practical engineering applications, the low end frequency of millimeter wave is usually lowered to 26 GHz. In the electromagnetic spectrum, the frequency of millimeter wave is between infrared wave and microwave. Compared with infrared wave, millimeter wave can work in all-weather condition and can be applied in severe environment, such as smoke and mist. Under circumstance of more and more crowed microwave frequency band, millimeter wave has the advantages of microwave, and also has some advantages that low-frequency band microwaves do not have. Compared with microwave, millimeter wave has short wavelength and wide frequency band (having enormous usage room), and the propagation feature in the air is a typical characteristic of millimeter wave. Specifically, millimeter wave has the following characteristics: 1. high precision, millimeter wave radar is more easily to obtain narrow wave beam and large absolute bandwidth, and millimeter wave radar system has better anti-electronic interference. 2. In a Doppler radar, millimeter wave has high Doppler frequency resolution. 3. In a millimeter wave imaging system, millimeter wave is sensitive to an object's shape and structure and has a good ability to distinguish a metal object and background environment, and the obtained image has high resolution, so as to improve the ability of identifying and detecting an object. 4. Millimeter wave can penetrate plasma. 5. Compared with infrared wave, millimeter wave is less influenced by severe natural environment. 6. Millimeter wave system is small in volume and light in weight, and compared with microwave circuit, the size of millimeter wave system is much smaller. Therefore, millimeter wave system is more easily to be integrated. It is these unique characteristics that bring millimeter wave technology wide application, especially in the fields of non-destructive inspection and security inspection.

Early in 1889, some scholars had researched on millimeter wave technology. An important technical breakthrough appeared in the 1930's, and this technology gets persistent developing hereafter. Since UK Defense Research Agency developed the first millimeter wave radiation imaging system "Green Minnow" in the late 1950's, many scientists in Europe and America have been working on the research and development of millimeter wave radiation imaging technology. With the technical breakthrough of millimeter wave solid state semiconductor devices, especially Monolithic Microwave Integrated Circuit (MMIC), and with the growing maturity of signal processing, computer technique and theory modeling level, millimeter wave radiation imaging technology has developed rapidly and has been widely used in the field of military and civilian for detecting hidden prohibited goods. At the initial development stage of millimeter wave imaging, all millimeter wave imaging systems adopted single-channel mechanical scanning mechanism. Such imaging mechanism is simple in structure, but the scanning time is long. In order to shorten scanning time, related organizations have developed related products successively. For example, Veta125 imager, in addition to a transmitting scanning system, the imager also has an 8×8 array receiving mechanism; PMC-2 imaging system, the antenna unit in this imaging system adopts the technology of 3 mm phased-array antenna and adopts a millimeter wave with the center frequency of 84 GHz; a focal plane imaging array imaging system, the center frequency of the adopted millimeter wave is 94 GHz; a millimeter wave imaging system, the center frequency of the adopted millimeter wave is 89 GHz. At the present stage of millimeter wave imaging field, a three-dimensional holographic imaging system has been developed, and its scanning mechanism is based on cylinder scanning, and the imaging system has realized the commercialization of millimeter wave imaging system. This imaging system adopts active imaging mechanism, obtaining the object's three-dimensional millimeter wave image by holographic algorithm inversion. At present, related organizations are dedicating effort to developing millimeter wave imaging system with higher frequency.

Millimeter wave imaging system mainly comprises active millimeter wave imaging and passive millimeter wave imaging. The advantages of passive millimeter wave imaging are simple structure and low implementation cost, and the drawbacks are too long imaging time and inferior imaging resolution. With the development of millimeter wave device technology, active millimeter wave imaging is gaining more and more attention. In active millimeter wave imaging systems, the millimeter wave active holographic imaging system is a commonly used imaging system. The millimeter wave active holographic imaging system is derived from the optical hologram method, which uses the electromagnetic wave's coherence principle: a high-stability millimeter wave signal is transmitted, an echo signal reflected from each point of a target is received, and then the echo signal is conducted coherent processing with a high-coherence reference signal to extract the echo signal's amplitude and phase information, so as to obtain the emission characteristic of the target; finally, the millimeter wave image of the target in a scene is obtained by a data and image processing method. The millimeter image obtained in a millimeter wave active holographic imaging system has a good resolution. The millimeter wave active holographic imaging system can significantly reduce imaging time when cooperating with a mechanical scanning system, so industrialization can be realized. Therefore, the millimeter wave active holographic imaging system is more and more widely used in security inspection systems, hereinafter referred to as "millimeter wave holographic imaging security inspection system." As such, how to improve the imaging definition of the millimeter wave holographic imaging security inspection system becomes a problem to be solved urgently.

SUMMARY

In view of the above, with respect to the problem of how to improve the imaging definition of the millimeter wave holographic imaging security inspection system, it is necessary to provide a millimeter wave security inspection instrument debugging system and a millimeter wave security inspection instrument debugging method.

A millimeter wave security inspection instrument debugging system, which is used for debugging the imaging definition of a millimeter wave holographic imaging security inspection system, comprising a main control apparatus, a millimeter wave transmitting antenna, and a millimeter wave receiving antenna; the main control apparatus is electrically connected to the millimeter wave transmitting antenna and the millimeter wave receiving antenna respectively;

the main control apparatus is used for generating a millimeter wave detection signal and a reference signal; the main control apparatus is also used for, where the millimeter wave transmitting antenna, the millimeter wave receiving antenna and an detected object are respectively located at different relative positions, transmitting the millimeter wave detection signal to the detected object by means of the millimeter wave transmitting antenna, and receiving an echo signal reflected from the detected object by means of the millimeter wave receiving antenna, and then using a holographic image technique to perform three-dimensional imaging according to the reference signal and the echo signal.

According to an embodiment, the main control apparatus comprises a signal processor and a TR assembly; the signal processor is electrically connected to the TR assembly; the TR assembly is electrically connected to the millimeter wave transmitting antenna and the millimeter wave receiving antenna respectively;

the TR assembly is used for generating the millimeter wave detection signal and the reference signal and, where the millimeter wave transmitting antenna, the millimeter wave receiving antenna and the detected object are respectively located at different relative positions, transmitting the millimeter wave detection signal to the detected object by means of the millimeter wave transmitting antenna; the TR assembly is also used for receiving an echo signal reflected by the detected object by means of the millimeter wave receiving antenna and processing the echo signal; the signal processor is configured to use the holographic image technique to perform three-dimensional imaging according to the reference signal and the echo signal processed by the TR assembly.

According to an embodiment, the millimeter wave security inspection instrument debugging system also comprises a machine control apparatus; the millimeter wave transmitting antenna and the millimeter wave receiving antenna are mounted on the machine control apparatus; the machine control apparatus is used for changing the positive position of the millimeter wave transmitting antenna and the millimeter wave receiving antenna.

According to an embodiment, the machine control apparatus comprises an up-and-down unit and a horizontal movement unit, the horizontal movement unit is mounted on the up-and-down unit; the millimeter wave transmitting antenna or the millimeter wave receiving antenna is mounted on horizontal movement unit.

According to an embodiment, the horizontal movement unit is a guideway shifting platform.

A millimeter wave security inspection instrument debugging method, comprising:

generating a millimeter wave detection signal and a reference signal;

transmitting the millimeter wave detection signal to the detected object by means of the millimeter wave transmitting antenna;

receiving the echo signal reflected by the detected object by means of the millimeter wave receiving antenna;

performing three-dimensional imaging using a holographic image technique according to the reference signal and the echo signal;

executing the stage of transmitting the millimeter wave detection signal to the detected object by means of the millimeter wave transmitting antenna after determining that the relative positions of the millimeter wave transmitting antenna, the millimeter wave receiving antenna and the detected object have been changed.

According to an embodiment, the stage of executing the stage of transmitting the millimeter wave detection signal to the detected object by means of the millimeter wave transmitting antenna after determining that the relative position of the millimeter wave transmitting antenna, the millimeter wave receiving antenna and the detected object have been changed comprises:

executing the stage of transmitting the millimeter wave detection signal to the detected object by means of the millimeter wave transmitting antenna after determining that the relative position of the millimeter wave transmitting antenna and the millimeter wave receiving antenna have been changed.

According to an embodiment, the stage of executing the stage of transmitting the millimeter wave detection signal to the detected object by means of the millimeter wave transmitting antenna after determining that the relative position of the millimeter wave transmitting antenna and the millimeter wave receiving antenna have been changed comprises:

executing the stage of transmitting the millimeter wave detection signal to the detected object by means of the millimeter wave transmitting antenna after determining that the relative position of the millimeter wave transmitting antenna and the millimeter wave receiving antenna have been changed in the horizontal direction; wherein the horizontal direction is perpendicular to the vertical direction;

when the millimeter wave transmitting antenna and the millimeter wave receiving antenna are at the optimal relative position in the horizontal direction, after determining that the relative position of the millimeter wave transmitting antenna and the millimeter wave receiving antenna have been changed in the vertical direction, executing the stage of transmitting the millimeter wave detection signal to the detected object by means of the millimeter wave transmitting antenna.

According to an embodiment, the stage of executing the stage of transmitting the millimeter wave detection signal to the detected object by means of the millimeter wave transmitting antenna after determining that the relative position of the millimeter wave transmitting antenna and the millimeter wave receiving antenna have been changed comprises:

executing the stage of transmitting the millimeter wave detection signal to the detected object by means of the millimeter wave transmitting antenna after determining that the relative position of the millimeter wave transmitting antenna and the millimeter wave receiving antenna have been changed in the vertical direction;

when the millimeter wave transmitting antenna and the millimeter wave receiving antenna are at the optimal relative position in the vertical direction, after determining that the relative position of the millimeter wave transmitting antenna and the millimeter wave receiving antenna have been changed in the horizontal direction, executing the stage of transmitting the millimeter wave detection signal to the detected object by means of the millimeter wave transmitting antenna; wherein the horizontal direction is perpendicular to the vertical direction.

According to an embodiment, the stage of executing the stage of transmitting the millimeter wave detection signal to the detected object by means of the millimeter wave transmitting antenna after determining that the relative position of the millimeter wave transmitting antenna, the millimeter wave receiving antenna and the detected object have been changed also comprises:

when the millimeter wave transmitting antenna and the millimeter wave receiving antenna are at the optimal relative position, after determining that the relative position of the millimeter wave transmitting antenna and the millimeter wave receiving antenna have been changed, executing the stage of transmitting the millimeter wave detection signal to the detected object by means of the millimeter wave transmitting antenna.

The beneficial technical effect of the millimeter wave security inspection instrument debugging system and the millimeter wave security inspection instrument debugging method is that: the main control apparatus is used for generating a millimeter wave detection signal and a reference signal. The main control apparatus is also used for, where a millimeter wave transmitting antenna, a millimeter wave receiving antenna and a detected object are respectively located at different relative positions, transmitting the millimeter wave detection signal to the detected object by means of the millimeter wave transmitting antenna, and receiving an echo signal reflected from the detected object by means of the millimeter wave receiving antenna, and then using a holographic image technique to perform three-dimensional imaging according to the reference signal and the echo signal.

Therefore, the main control apparatus can finally obtain a plurality of three-dimensional imaging results corresponding to a plurality of relative positions of the millimeter wave transmitting antenna, the millimeter wave receiving antenna and the detected object, so that the optimal relative position of the millimeter wave transmitting antenna, the millimeter wave receiving antenna and the detected object can be determined according to these three-dimensional imaging results, i.e., the optimal imaging way. The optimal imaging way is applied to a millimeter wave holographic imaging security inspection system, thereby improving the imaging definition of the millimeter wave holographic imaging security inspection system.

BRIEF DESCRIPTION OF THE DRAWINGS

In order to illustrate the embodiments of this disclosure or the technical solutions of existing technologies more clearly, the appended drawings used to describe embodiments of this disclosure or existing technologies are introduced briefly below. Obviously, the embodiments described below are merely some embodiments of this disclosure. According to these drawings, persons skilled in the art can obtain drawings of other embodiments without paying creative effort.

DETAILED DESCRIPTION

In order to facilitate understanding this disclosure, the present disclosure will be described fully below referring to the accompanying drawings. The accompanying drawings illustrate embodiments of this disclosure. However, this disclosure can be implemented by a wide variety of ways, not limited by the embodiments described herein. Conversely, the purpose of these embodiments is to understand the disclosure of this disclosure more thoroughly and more comprehensively.

Unless otherwise defined, all the technical and scientific terminologies used herein have the same meanings that are commonly understood by persons skilled in the art. Terminologies used in the specification of this disclosure are for the purpose of describing the specific embodiments, not intended to limit this disclosure. The terminologies "and/or" used herein comprise any or all combinations of one or more related listed items.

Figure 1:
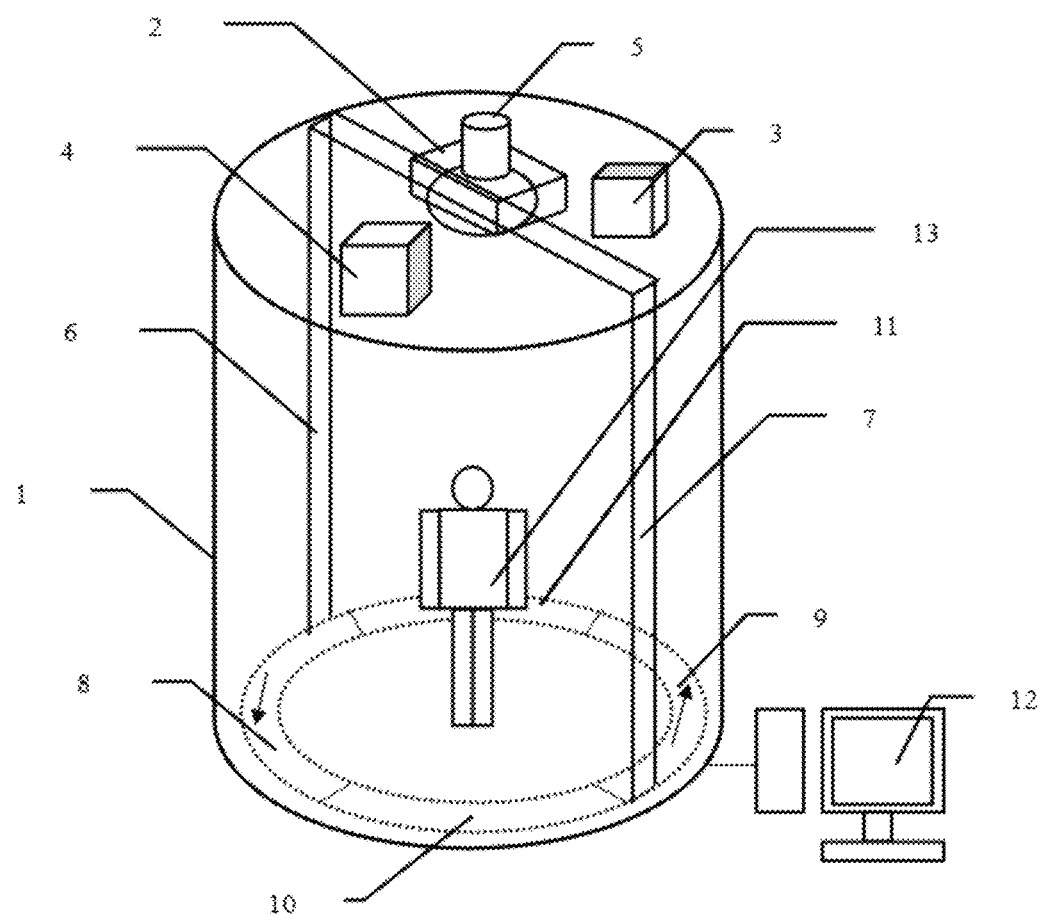
FIG. 1 illustrates a composition and structure diagram of a millimeter wave holographic imaging security inspection system.

An embodiment provides a millimeter wave security inspection instrument debugging system, which is used to debug the imaging definition of a millimeter wave holographic imaging security inspection system. As illustrated in FIG. 1, the millimeter wave holographic imaging security inspection system comprises a cylinder main body frame 1, a millimeter wave transceiver module 2, a first millimeter wave switching antenna array 6, a second millimeter wave switching antenna array 7, a rotary scan driving apparatus 5, a control apparatus 3, a parallel image processing apparatus 4, and a computer 12.

An entrance 10 and an exit 11 are disposed in the cylinder main body frame 1. A person to be detected 13 enters the millimeter wave holographic imaging security inspection system from the entrance 10 and goes out from the exit 11 after detection. Furthermore, a first scanning area 8 and a second scanning area 9 are symmetrically disposed between the entrance 10 and the exit 11. The rotary scan driving apparatus 5 is disposed on the top of the cylinder main body frame 1 and is connect to the first millimeter wave switching antenna array 6 and the second millimeter wave switching antenna array 7 respectively. By controlling the rotary scan driving apparatus 5, the control apparatus 3 controls the first millimeter wave switching antenna array 6 and the second millimeter wave switching antenna array 7 to rotate along the first scanning area 8 and the second scanning area 9 respectively. Both the first millimeter wave switching antenna array 6 and the second millimeter wave switching antenna array 7 comprise a few groups of transmitting antennas and receiving antennas.

The millimeter wave transceiver module 2 is electrically connected to the first millimeter wave switching antenna array 6, the second millimeter wave switching antenna array 7 and the parallel image processing apparatus 4 respectively. The millimeter wave transceiver module 2 is used to generate a millimeter wave detection signal and a reference signal. Meanwhile, the millimeter wave transceiver module 2 transmits the millimeter wave detection signal to the person to be detected 13 by means of transmitting antennas. Afterwards, the millimeter wave transceiver module 2 receives an echo signal reflected by the person to be detected 13 by means of receiving antennas and transmits the echo signal to the parallel image processing apparatus 4. The parallel image processing apparatus 4 uses holographic image technique to perform a three-dimensional imaging according to the reference signal and the echo signal, and the computer 12 displays the image. Therefore, in the millimeter wave security inspection instrument debugging system, the determinant of imaging definition is the relative position of the transmitting antenna, the receiving antenna, and the person to be detected 13.

Figure 2:
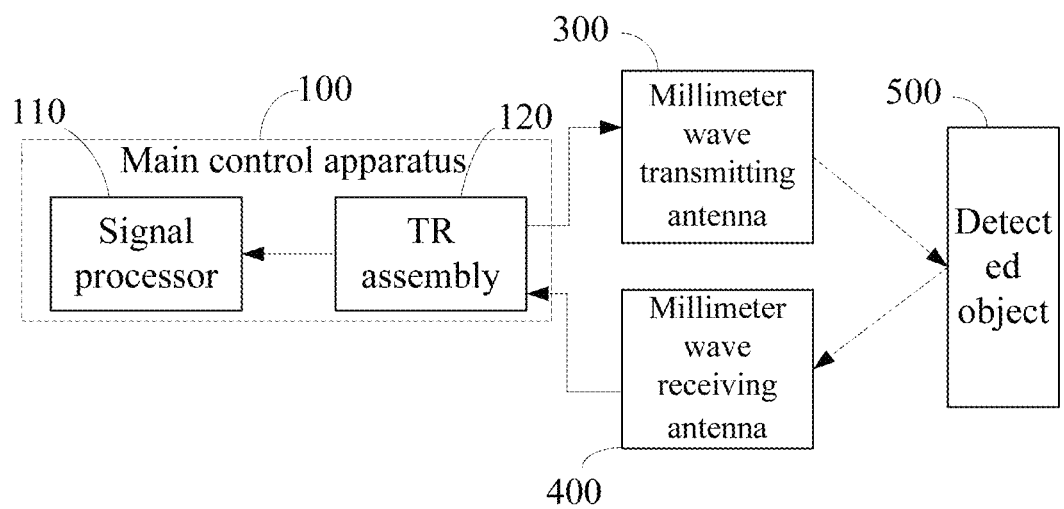
FIG. 2 illustrates a composition and structure diagram of a millimeter wave security inspection instrument debugging system provided by an embodiment.

The millimeter wave security inspection instrument debugging system provided in this embodiment is used to debug the imaging definition of a millimeter wave holographic imaging security inspection system to find the optimal relative position of the transmitting antenna, the receiving antenna, and the person to be detected 13, so as to obtain the optimal imaging way. As illustrated in FIG. 2, the millimeter wave security inspection instrument debugging system comprises a main control apparatus 100, a millimeter wave transmitting antenna 300, and a millimeter wave receiving antenna 400. The main control apparatus 100 is electrically connected to the millimeter wave transmitting antenna 300 and the millimeter wave receiving antenna 400 respectively.

The millimeter wave transmitting antenna 300 has the same property as that of the transmitting antenna of the first millimeter wave switching antenna array 6 and the second millimeter wave switching antenna array 7. The millimeter wave receiving antenna 400 has the same property as that of the receiving antenna of the first millimeter wave switching antenna array 6 and the second millimeter wave switching antenna array 7. Meanwhile, to facilitate debugging, the relative positions among the millimeter wave transmitting antenna 300, the millimeter wave receiving antenna 400 and a detected object 500 can be different according to testing requirements.

The main control apparatus 100 is used to generate a millimeter wave detection signal and a reference signal. The millimeter wave detection signal and the reference signal are namely the millimeter wave detection signal and the reference signal used in the millimeter wave holographic imaging security inspection system. The main control apparatus 100 is also used for, where the millimeter wave transmitting antenna 300, the millimeter wave receiving antenna 400 and the detected object 500 are respectively located at different relative positions, transmitting the millimeter wave detection signal to the detected object 500 by means of the millimeter wave transmitting antenna 300, and receiving an echo signal reflected from the detected object 500 by means of the millimeter wave receiving antenna 400, and then using a holographic image technique to perform three-dimensional imaging according to the reference signal and the echo signal.

The relative position refers to position relationship of up and down, front and back, left and right in the space of two. The relative position of the millimeter wave transmitting antenna 300, the millimeter wave receiving antenna 400 and the detected object 500 being in different situations refers to comprising many situations, and between any two situations, it can be that: the relative position of a pair (for example, the millimeter wave transmitting antenna 300 and the millimeter wave receiving antenna 400) of the three, the millimeter wave transmitting antenna 300, the millimeter wave receiving antenna 400 and the detected object 500, has been changed, or the relative positions of two pairs of the three have changed, or all the relative positions of the three have changed.

As such, the data processing function executed by the main control apparatus 100 is similar to that executed by the millimeter wave transceiver module 2 and the parallel image processing apparatus 4, so as to ensure the data finally obtained by the millimeter wave security inspection instrument debugging system is applied to the millimeter wave holographic imaging security inspection system. Meanwhile, the difference is that, the main control apparatus 100 has to perform three-dimensional imaging many times, and each three-dimensional imaging result is obtained under the relative position of the millimeter wave transmitting antenna 300, the millimeter wave receiving antenna 400 and the detected object 500 being in one situation.

Therefore, the main control apparatus 100 finally can output a plurality of three-dimensional imaging results. As such, the three-dimensional imaging result with optimal imaging definition is selected from these three-dimensional imaging results, that is, setting the imaging related structure parameters in the millimeter wave holographic imaging security inspection system according to the optimal relative position among the millimeter wave transmitting antenna 300, the millimeter wave receiving antenna 400 and the detected object 500 corresponding to the optimal three-dimensional imaging result, i.e., the position arrangement among the transmitting antenna, the receiving antenna, and the person to be detected 13, so as to obtain the optimal imaging way. Specifically, the relative position of transmitting antenna and receiving antenna of the first millimeter wave switching antenna array 6 and the second millimeter wave switching antenna array 7 in the millimeter wave holographic imaging security inspection system is set according to the relative position of the millimeter wave transmitting antenna 300 and the millimeter wave receiving antenna 400; the relative position of the center of the cylinder main body frame 1 (i.e., the positon of the person to be detected 13), the first millimeter wave switching antenna array 6 and the second millimeter wave switching antenna array 7 in the millimeter wave holographic imaging security inspection system is set according to the relative position of the millimeter wave transmitting antenna 300, the millimeter wave receiving antenna 400, and the detected object 500.

In view of the above, in the millimeter wave security inspection instrument debugging system provided in this embodiment, the main control apparatus 100 finally can obtain a plurality of three-dimensional imaging results corresponding to a plurality of relative positions of the millimeter wave transmitting antenna 300, the millimeter wave receiving antenna 400, and the detected object 500, so as to determine the optimal relative position of the millimeter wave transmitting antenna 300, the millimeter wave receiving antenna 400, and the detected object 500. The optimal relative position is then applied in the millimeter wave holographic imaging security inspection system to improve the imaging definition thereof. It should be noted that, the optimal relative position in this embodiment refers to the relative position corresponding to the optimal imaging definition.

Specifically, as illustrated in FIG. 1, the main control apparatus 100 comprises a signal processor 110 and TR (Transmitter and Receiver, transceiver) assembly 120. The signal processor 110 and the TR assembly 120 are connected electrically. The TR assembly 120 is connected electrically to the millimeter wave transmitting antenna 300 and the millimeter wave receiving antenna 400 respectively.

The TR assembly 120 is used for generating a millimeter wave detection signal and a reference signal and, where the millimeter wave transmitting antenna 300, the millimeter wave receiving antenna 400 and the detected object 500 are respectively located at different relative positions, transmitting the millimeter wave detection signal to the detected object 500 by means of the millimeter wave transmitting antenna 300. In addition, the TR assembly 120 transmits the reference signal to the signal processor 110. Meanwhile, the TR assembly 120 is also used for receiving an echo signal reflected by the detected object 500 by means of the millimeter wave receiving antenna 400 and processing the echo signal, wherein the TR assembly 120 can perform data optimization process, such as amplification, to the echo signal.

The signal processor 110 is configured to use a holographic image technique to perform three-dimensional imaging according to the reference signal and the echo signal processed by the TR assembly 120. Specifically, the signal processor 110 performs a coherence processing to the echo signal processed by the TR assembly 120 and the reference signal to extract the echo signal's amplitude and phase information. Finally, the three-dimensional image result of the detected object 500 is obtained by related image processing method (e.g., cylinder two-dimensional fast Fourier transform and cylinder deconvolution).

It should be understood that, the specific structure of the signal processor 110 is not limited to the above embodiment, and any structure is included as long as the three-dimensional image result of the detected object 500 can be obtained when the millimeter wave transmitting antenna 300, the millimeter wave receiving antenna 400, and the detected object 500 are in different relative positions. For example, the TR assembly 120 can also perform the function of extracting the echo signal's amplitude and phase information.

Further, the millimeter wave security inspection instrument debugging system also comprises a machine control apparatus (not illustrated). The machine control apparatus can change the position of the carried objects. The millimeter wave transmitting antenna 300 and the millimeter wave receiving antenna 400 are mounted on the machine control apparatus. Meanwhile, the machine control apparatus is used for changing the relative position of the millimeter wave transmitting antenna 300 and the millimeter wave receiving antenna 400.

Therefore, when the millimeter wave transmitting antenna 300 is mounted on the machine control apparatus, the machine control apparatus can change the relative position of the millimeter wave transmitting antenna 300 and the millimeter wave receiving antenna 400 by means of changing the absolute position of the millimeter wave transmitting antenna 300. When the millimeter wave receiving antenna 400 is mounted on the machine control apparatus, the machine control apparatus can change the relative position of the millimeter wave transmitting antenna 300 and the millimeter wave receiving antenna 400 by means of changing the absolute position of the millimeter wave receiving antenna 400.

It should be understood that, the millimeter wave security inspection instrument debugging system is not limited to the case comprising the machine control apparatus, and any case is included as long as it can make the millimeter wave transmitting antenna 300, the millimeter wave receiving antenna 400, and the detected object 500 have different relative positions. For example, the machine control apparatus can be replaced by man-made operation.

Specifically, the machine control apparatus can move left and right in the horizontal direction and move up and down in the vertical direction, wherein the horizontal direction is perpendicular to the vertical direction, and the horizontal direction is parallel to the up end and the bottom end of the cylinder main body frame 1. The machine control apparatus comprises an up-and-down unit and a horizontal movement unit. The up-and-down unit can move up and down in the vertical direction, and specifically can be a lifting platform. The horizontal movement unit can move left and right in the horizontal direction, and specifically can be a guideway shifting platform.

Furthermore, the horizontal movement unit is mounted on the up-and-down unit, and hence the horizontal movement unit can follow the up-and-down unit to move up and down. The millimeter wave transmitting antenna 300 or the millimeter wave receiving antenna 400 is mounted on horizontal movement unit. Taking the millimeter wave transmitting antenna 300 as an example, if keeping the up-and-down unit still and only controlling the horizontal movement unit to slide, then the millimeter wave transmitting antenna 300 is controlled to move in the horizontal direction with respect to the millimeter wave receiving antenna 400; if keeping the horizontal movement unit still and only controlling the up-and-down unit to move, then the millimeter wave transmitting antenna 300 is controlled to move in the vertical direction with respect to the millimeter wave receiving antenna 400.

It should be understood that, the specific implementation structure of the machine control apparatus is not limited to the above embodiment, any structure is included as long as it can move left and right in the horizontal direction and move up and down in the vertical direction.

Figure 3:
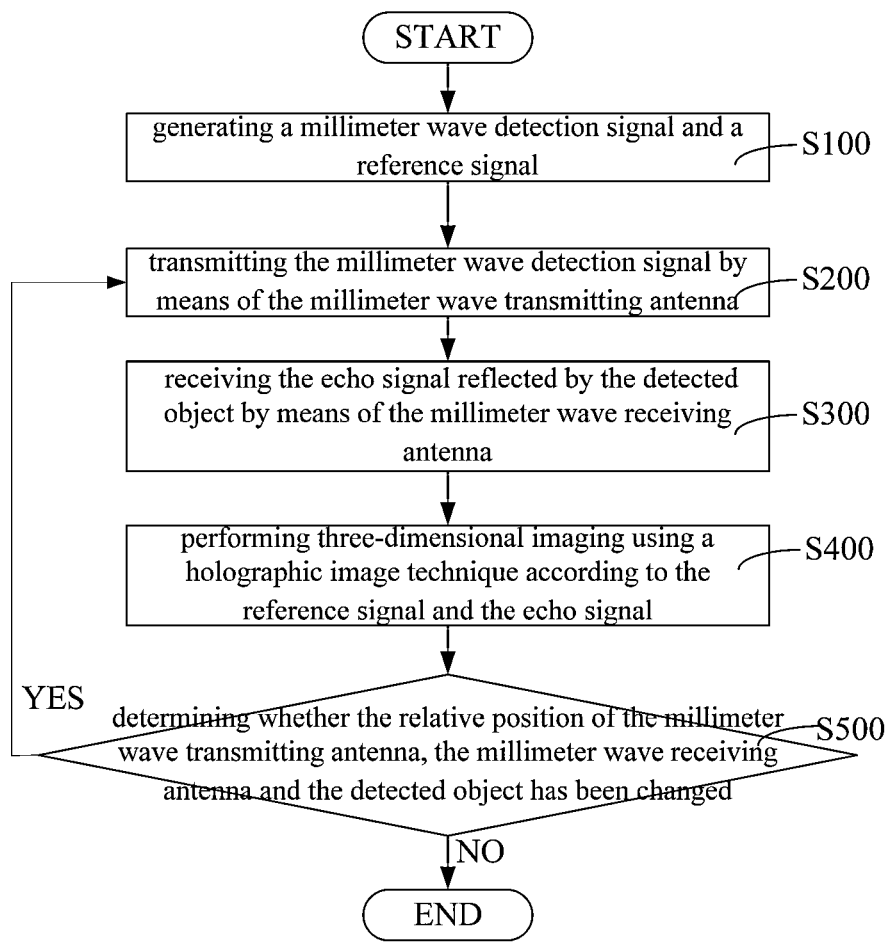
FIG. 3 illustrates a flow diagram of a millimeter wave security inspection instrument debugging method performed by a main control apparatus of the embodiment illustrated by FIG. 2.

Based on the above millimeter wave security inspection instrument debugging system, this embodiment also provides a millimeter wave security inspection instrument debugging method. As illustrated in FIG. 3, the millimeter wave security inspection instrument debugging method is executed by the main control apparatus 100, and comprises the following stages.

Stage S100, generating a millimeter wave detection signal and a reference signal.

The millimeter wave detection signal and the reference signal are namely the millimeter wave detection signal and the reference signal used in the millimeter wave holographic imaging security inspection system.

Stage S200, transmitting the millimeter wave detection signal to the detected object 500 by means of the millimeter wave transmitting antenna 300.

This stage is performed when the relative position of the millimeter wave transmitting antenna 300, the millimeter wave receiving antenna 400 and the detected object 500 is in one situation. In addition, when the millimeter wave detection signal reaches the detected object 500, an echo signal is generated by reflection.

Stage S300, receiving the echo signal reflected by the detected object 500 by means of the millimeter wave receiving antenna 400.

Stage S400, performing three-dimensional imaging using a holographic image technique according to the reference signal and the echo signal.

The principle of three-dimensional imaging in this stage is the same as the executing principle of the parallel image processing apparatus 4. After this stage is implemented, if debugging is needed, the relative position of the millimeter wave transmitting antenna 300, the millimeter wave receiving antenna 400 and the detected object 500 can be changed by man-made or machine control method.

Stage S500, determining whether the relative position of the millimeter wave transmitting antenna 300, the millimeter wave receiving antenna 400 and the detected object 500 has been changed, and if changed, stage S200 is executed again; else ending the process.

As such, if the relative position of the millimeter wave transmitting antenna 300, the millimeter wave receiving antenna 400 and the detected object 500 changes once, the main control apparatus 100 needs to execute stage S200 to stage S400 again, and finally a plurality of three-dimensional imaging results are obtained. The optimal the relative position of the millimeter wave transmitting antenna 300, the millimeter wave receiving antenna 400 and the detected object 500 is determined according to comparing result of these three-dimensional imaging results. Thereafter, this data is applied to a millimeter wave holographic imaging security inspection system, and the millimeter wave holographic imaging security inspection system thus can have an optimal imaging way, so as to improve the imaging definition thereof.

Figure 4:
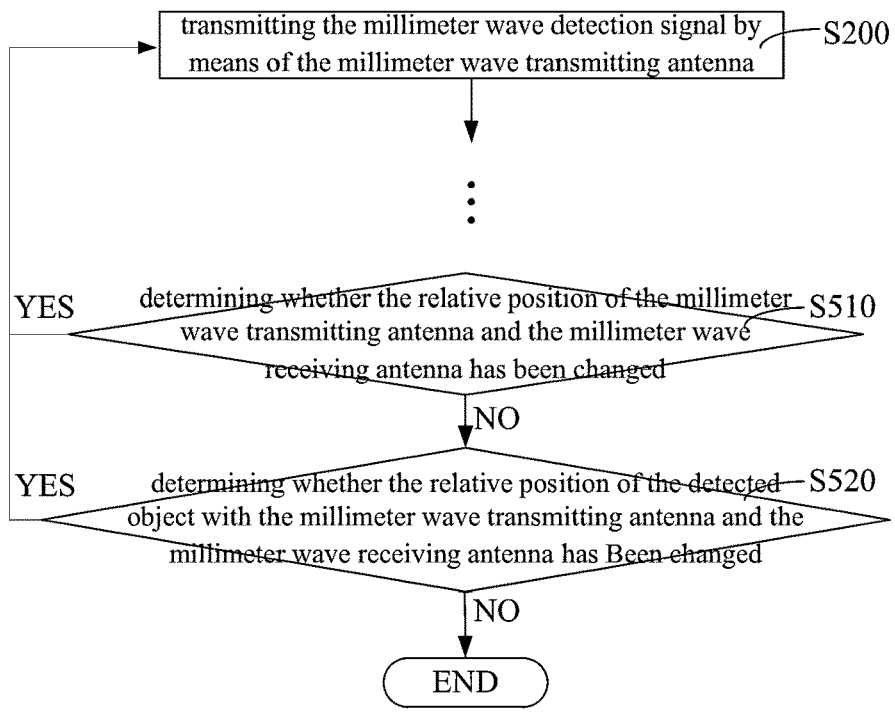
FIG. 4 illustrates a specific flow diagram of stage 500 in the millimeter wave security inspection instrument debugging method illustrated in FIG. 3.

In stage S500 of this embodiment, the relative position of the millimeter wave transmitting antenna 300 and the millimeter wave receiving antenna 400 is first debugged to obtain the optimal relative position between them. Then, while the millimeter wave transmitting antenna 300 and the millimeter wave receiving antenna 400 are controlled in the optimal position, the relative position of the detected object 500 with the millimeter wave transmitting antenna 300 and the millimeter wave receiving antenna 400 is debugged. The specific implementations of stage S500 are described in detail below, as illustrated in FIG. 4.

Stage S510, determining whether the relative position of the millimeter wave transmitting antenna 300 and the millimeter wave receiving antenna 400 has been changed, and if changed, stage S200 is executed again; else executing stage S520.

Figure 5:
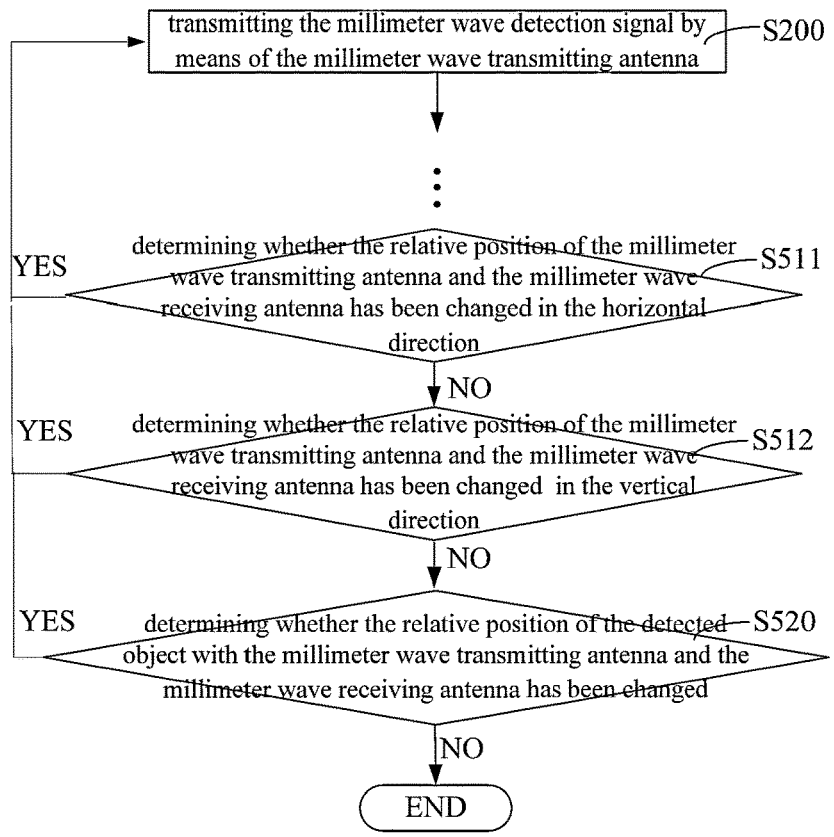
FIG. 5 illustrates a specific flow diagram of stage 510 in the millimeter wave security inspection instrument debugging method illustrated in FIG. 4.

In this stage, the machine control apparatus controls the relative position of the millimeter wave transmitting antenna 300 and the millimeter wave receiving antenna 400 to switch to different situations. Meanwhile, when the relative position of the millimeter wave transmitting antenna 300 and the millimeter wave receiving antenna 400 is in any situation, the main control apparatus 100 need to execute the process from stage S200 to stage S400 to obtain corresponding three-dimensional imaging result. After enough three-dimensional imaging results have been obtained, these three-dimensional imaging results are compared so as to select a three-dimensional imaging result with best imaging definition, and then the optimal relative position of the millimeter wave transmitting antenna 300 and the millimeter wave receiving antenna 400 is obtained. Stage S510 specifically comprises the following process, as illustrated in FIG. 5.

Stage S511, determining whether the relative position of the millimeter wave transmitting antenna 300 and the millimeter wave receiving antenna 400 has been changed in the horizontal direction, and if changed, executing stage S200 again; else executing stage S512, wherein the horizontal direction is perpendicular to the vertical direction, and the horizontal direction is parallel to the up end and the bottom end directions of the cylinder main body frame 1.

Figure 6:
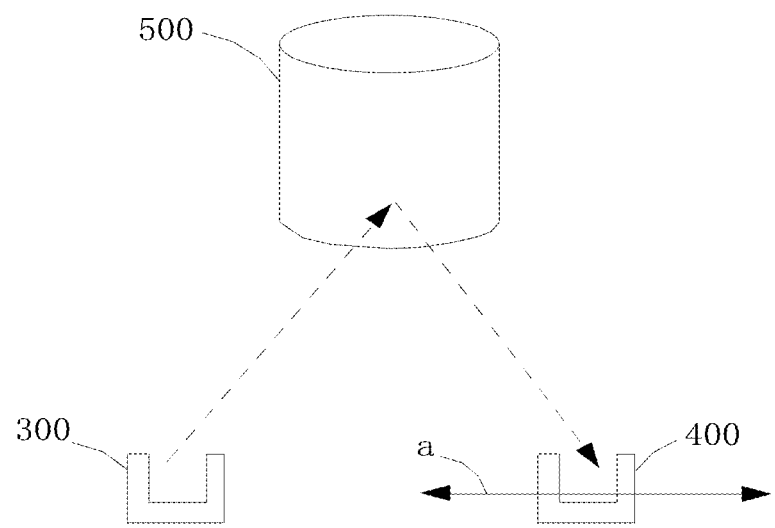
FIG. 6 illustrates a diagram of relative position in the horizontal direction between a millimeter wave transmitting antenna and a millimeter wave receiving antenna of the embodiment illustrated in FIG. 5.

As illustrated in FIG. 6, the specific execution process of stage S511 comprises: first, the millimeter wave transmitting antenna 300 and the millimeter wave receiving antenna 400 are maintained at the same horizontal height by the machine control apparatus or other manners. Thereafter, the position of the millimeter wave transmitting antenna 300 is maintained unchanged by the machine control apparatus or other manners, and the millimeter wave receiving antenna 400 is controlled to move in horizontal direction many times with the same interval by the machine control apparatus or other manners. In FIG. 6, the direction of "a" refers to the moving direction of the millimeter wave receiving antenna 400. Meanwhile, each time the position of the millimeter wave receiving antenna 400 changes in the horizontal direction, the main control apparatus 100 executes the process from stage S200 to stage S400, and hence a plurality of three-dimensional imaging results corresponding to the horizontal direction are finally obtained. When the millimeter wave receiving antenna 400 has finished moving in the horizontal direction, all the three-dimensional imaging results obtained from the above process are compared, so as to determine the optimal relative position of the millimeter wave transmitting antenna 300 and the millimeter wave receiving antenna 400 in the horizontal direction.

It should be understood that, during the above process, it is also possible to maintain the position of the millimeter wave receiving antenna 400 unchanged, and control the millimeter wave transmitting antenna 300 to move in the horizontal direction, so as to determine the optimal relative position of the millimeter wave transmitting antenna 300 and the millimeter wave receiving antenna 400 in the horizontal direction.

Stage S512, when the millimeter wave transmitting antenna 300 and the millimeter wave receiving antenna 400 are at the optimal relative position in the horizontal direction, determining whether the relative position of the millimeter wave transmitting antenna 300 and the millimeter wave receiving antenna 400 has been changed in the vertical direction, if changed, executing stage S200, else, executing stage S520, wherein the vertical direction is perpendicular to the up end and the bottom end of the cylinder main body frame 1.

Figure 7:
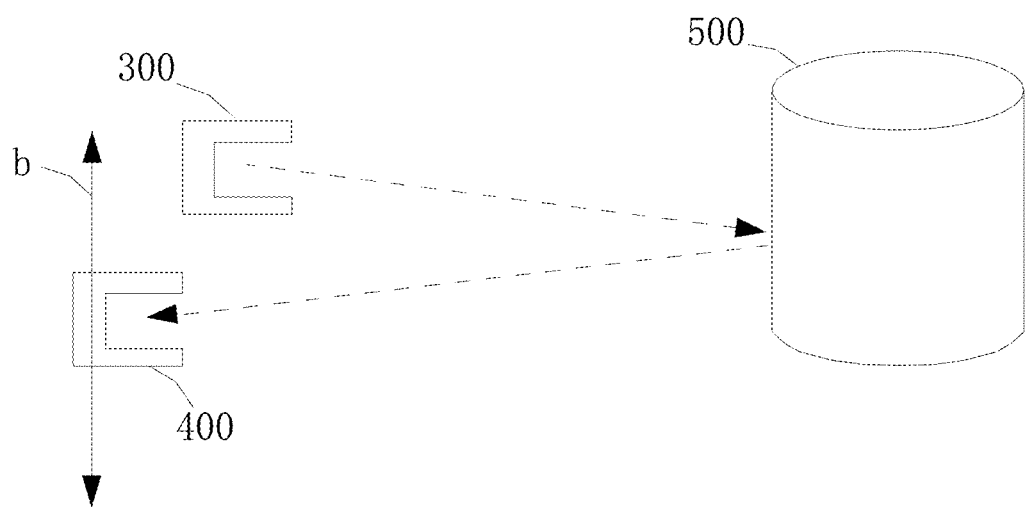
FIG. 7 illustrates a diagram of relative position in the vertical direction between the millimeter wave transmitting antenna and the millimeter wave receiving antenna of the embodiment illustrated in FIG. 5.

As illustrated in FIG. 7, the specific execution process of stage S512 comprises: first, the millimeter wave transmitting antenna 300 and the millimeter wave receiving antenna 400 are maintained at the same horizontal height by the machine control apparatus or other manners, and the millimeter wave transmitting antenna 300 and the millimeter wave receiving antenna 400 are maintained in the horizontal direction at the optimal relative position obtained by stage S511. Thereafter, the position of the millimeter wave transmitting antenna 300 is maintained unchanged by the machine control apparatus or other manners, and the millimeter wave receiving antenna 400 is controlled to move in the vertical direction many times with the same interval by the machine control apparatus or other manners. In FIG. 7, the direction of "b" refers to the moving direction of the millimeter wave receiving antenna 400. Meanwhile, each time the position of the millimeter wave receiving antenna 400 changes in the vertical direction, the main control apparatus 100 executes the process from stage S200 to stage S400, and a plurality of three-dimensional imaging results corresponding to the vertical direction are finally obtained. When the millimeter wave receiving antenna 400 has finished moving in the vertical direction, all the three-dimensional imaging results obtained from the above process are compared, so as to determine the optimal relative position of the millimeter wave transmitting antenna 300 and the millimeter wave receiving antenna 400 in the vertical direction.

It should be understood that, during the above process, it is also possible to maintain the position of the millimeter wave receiving antenna 400 unchanged, and control the millimeter wave transmitting antenna 300 to move in the vertical direction, so as to determine the optimal relative position of the millimeter wave transmitting antenna 300 and the millimeter wave receiving antenna 400 in the vertical direction.

As such, the optimal relative position (including optimal relative positions in the horizontal and vertical directions) of the millimeter wave transmitting antenna 300 and the millimeter wave receiving antenna 400 is obtained, and the optimal relative position is used in the millimeter wave holographic imaging security inspection system. That is, the relative position of transmitting antennas and receiving antennas of each group in the first millimeter wave switching antenna array 6 and the second millimeter wave switching antenna array 7 is controlled to be the same as the optimal relative position of the millimeter wave transmitting antenna 300 and the millimeter wave receiving antenna 400, so as to make the transmitting antenna and the receiving antenna to be at the optimal imaging position.

Figure 9:
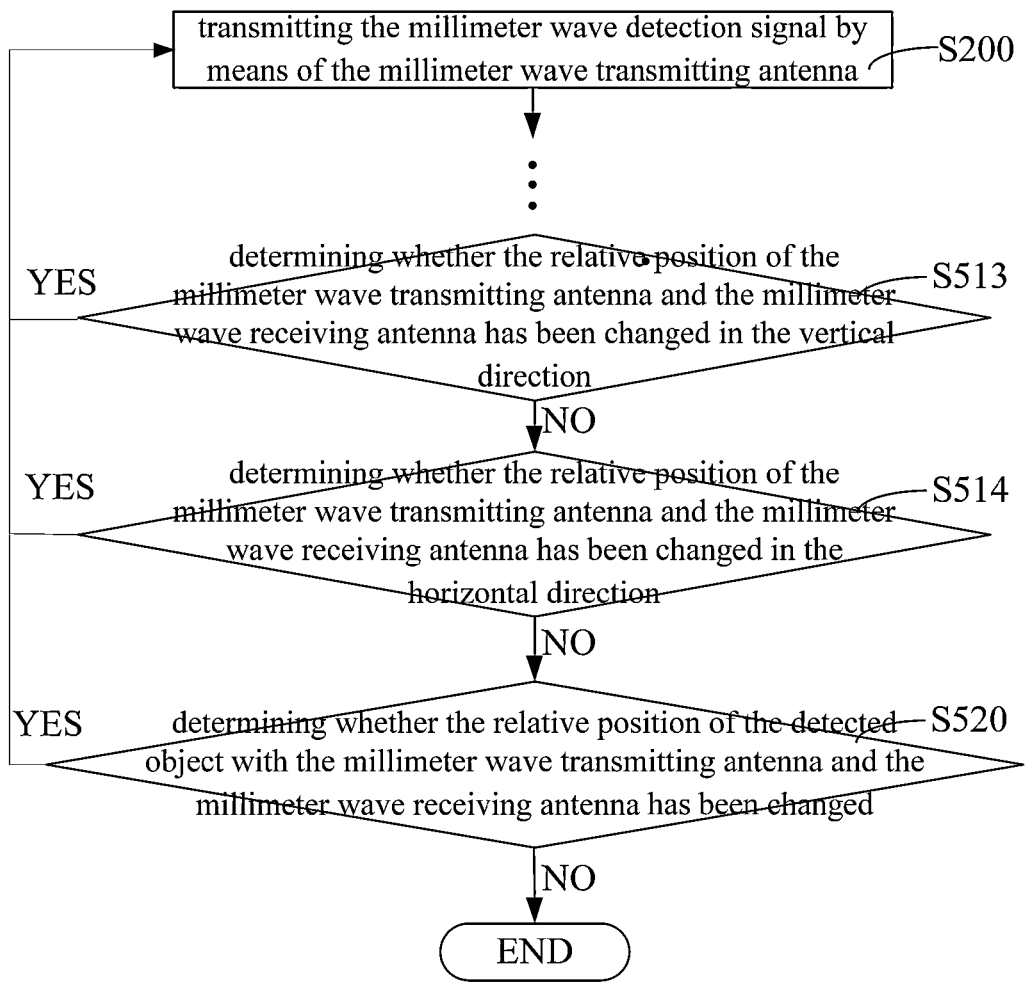
FIG. 9 illustrates another specific flow diagram of stage 510 in the millimeter wave security inspection instrument debugging method illustrated in FIG. 4.

In addition, stage S510 can be debugged by another way, as illustrated in FIG. 9.

Stage S513, determining whether the relative position of the millimeter wave transmitting antenna 300 and the millimeter wave receiving antenna 400 has been changed in the vertical direction, and if changed, executing stage S200 again; else executing stage S514, wherein the vertical direction is perpendicular to the up end and the bottom end of the cylinder main body frame 1.

The specific execution process of stage S513 comprises: first, the millimeter wave transmitting antenna 300 and the millimeter wave receiving antenna 400 are maintained at the same vertical height by the machine control apparatus or other manners. Thereafter, the position of the millimeter wave transmitting antenna 300 is maintained unchanged by the machine control apparatus or other manners, and the millimeter wave receiving antenna 400 is controlled to move in vertical direction many times with the same interval. Meanwhile, each time the position of the millimeter wave receiving antenna 400 changes in the vertical direction, the main control apparatus 100 executes the process from stage S200 to stage S400, and hence a plurality of three-dimensional imaging results are obtained. When the millimeter wave receiving antenna 400 has finished moving in the vertical direction, all the three-dimensional imaging results obtained from the above process are compared, so as to determine the optimal relative position of the millimeter wave transmitting antenna 300 and the millimeter wave receiving antenna 400 in the vertical direction.

It should be understood that, during the above process, it is also possible to maintain the position of the millimeter wave receiving antenna 400 unchanged, and control the millimeter wave transmitting antenna 300 to move in the vertical direction, so as to determine the optimal relative position of the millimeter wave transmitting antenna 300 and the millimeter wave receiving antenna 400 in the vertical direction.

Stage S514, when the millimeter wave transmitting antenna 300 and the millimeter wave receiving antenna 400 are at the optimal relative position in the vertical direction, determining whether the relative position of the millimeter wave transmitting antenna 300 and the millimeter wave receiving antenna 400 has been changed in the horizontal direction, if changed, executing stage S200, else, executing stage S520, wherein the horizontal direction is perpendicular to the vertical direction, and the horizontal direction is parallel to the up end and the bottom end of the cylinder main body frame 1.

The specific execution process of stage S514 comprises: first, the millimeter wave transmitting antenna 300 and the millimeter wave receiving antenna 400 are maintained at the same vertical direction by the machine control apparatus or other manners, and the millimeter wave transmitting antenna 300 and the millimeter wave receiving antenna 400 are maintained in the vertical direction at the optimal relative position obtained by stage S513. Thereafter, the position of the millimeter wave transmitting antenna 300 is maintained unchanged by the machine control apparatus or other manners, and the millimeter wave receiving antenna 400 is controlled to move in the horizontal direction many times with the same interval by the machine control apparatus or other manners. Meanwhile, each time the position of the millimeter wave receiving antenna 400 changes in the horizontal direction, the main control apparatus 100 executes the process from stage S200 to stage S400, and plurality of three-dimensional imaging results are finally obtained. When the millimeter wave receiving antenna 400 has finished moving in the horizontal direction, all the three-dimensional imaging results obtained from the above process are compared, so as to determine the optimal relative position of the millimeter wave transmitting antenna 300 and the millimeter wave receiving antenna 400 in the horizontal direction. It should be understood that, during the above process, it is also possible to maintain the position of the millimeter wave receiving antenna 400 unchanged, and control the millimeter wave transmitting antenna 300 to move in the horizontal direction, so as to determine the optimal relative position of the millimeter wave transmitting antenna 300 and the millimeter wave receiving antenna 400 in the horizontal direction.

As such, the optimal relative position of the millimeter wave transmitting antenna 300 and the millimeter wave receiving antenna 400 is obtained, and the optimal relative position is used in the millimeter wave holographic imaging security inspection system. That is, the relative position of transmitting antennas and receiving antennas of each group in the first millimeter wave switching antenna array 6 and the second millimeter wave switching antenna array 7 is controlled to be the same as the optimal relative position of the millimeter wave transmitting antenna 300 and the millimeter wave receiving antenna 400.

It should understand that, the implementation of stage S510 is not limited to the above two situations, as long as the optimal relative position of the millimeter wave transmitting antenna 300 and the millimeter wave receiving antenna 400 can finally be obtained. For example, the debugging can be implemented according to other directions except the above horizontal and vertical directions.

Thereafter, the millimeter wave transmitting antenna 300 and the millimeter wave receiving antenna 400 are placed at the optimal relative position obtained by stage S510, and the debugging process of the detected object 500 is continued, please refer to FIG. 4 again.

Stage S520, when the millimeter wave transmitting antenna 300 and the millimeter wave receiving antenna 400 are at the optimal relative position, determining whether the relative position of the detected object 500 with the millimeter wave transmitting antenna 300 and the millimeter wave receiving antenna 400 has been changed, if changed, executing stage S200, else, end the process.

Figure 8:
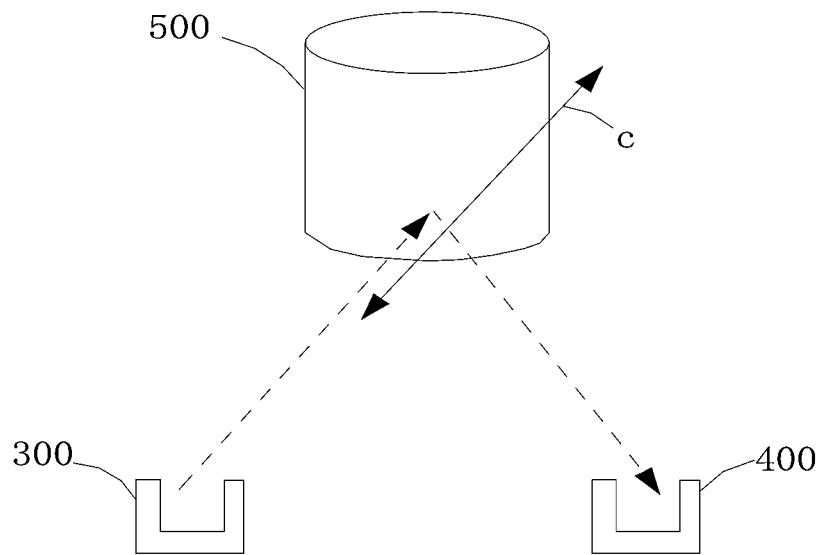
FIG. 8 illustrates a diagram of relative position of the detected object, the millimeter wave transmitting antenna and the millimeter wave receiving antenna of the embodiment illustrated in FIG. 4.

As illustrated in FIG. 8, the specific execution process of stage S520 comprises: first, the machine control apparatus or other manners maintains the millimeter wave transmitting antenna 300 and the millimeter wave receiving antenna 400 at the optimal relative position obtained by stage S510. Thereafter, the machine control apparatus or other manners maintains the positions of the millimeter wave transmitting antenna 300 and the millimeter wave receiving antenna 400 unchanged, and controls the detected object 500 to move many times with the same interval with respect to the millimeter wave transmitting antenna 300 and the millimeter wave receiving antenna 400. In FIG. 8, the direction of "c" refers to one moving direction of the detected object 500. Meanwhile, each time the position of the detected object 500 changes, the main control apparatus 100 executes the process from stage S200 to stage S400, and a plurality of three-dimensional imaging results are finally obtained. When the detected object 500 has finished moving, all the three-dimensional imaging results obtained from the above process are compared, so as to determine the optimal relative position of the detected object 500 with respect to the millimeter wave transmitting antenna 300 and the millimeter wave receiving antenna 400, and hence the optimal relative position is applied in the millimeter wave holographic imaging security inspection system. For example, because the person to be detected 13 is usually at the center position of the cylinder main body frame 1, the relative position of the center position among the cylinder main body frame 1, transmitting antennas and receiving antennas in the first millimeter wave switching antenna array 6 and the second millimeter wave switching antenna array 7 is the same as the relative position of the detected object 500, the millimeter wave transmitting antenna 300 and the millimeter wave receiving antenna 400, so that there is an optimal imaging distance among the detected object 500, the transmitting antenna, and the receiving antenna.

It should be understood that, during the above process, it is also possible to maintain the position of the detected object 500 unchanged, and control the millimeter wave transmitting antenna 300 and the millimeter wave receiving antenna 400 to move simultaneously, so as to determine the optimal relative position among the detected object 500, the millimeter wave transmitting antenna 300 and the millimeter wave receiving antenna 400.

Based on the above debugging process, the optimal elative position among the detected object 500, the millimeter wave transmitting antenna 300 and the millimeter wave receiving antenna 400 is obtained, so as to obtain the optimal relative position of the transmitting antenna, the receiving antenna, and the person to be detected 13. As a result, the optimal imaging way is obtained to improve the imaging definition.

In addition, the implementation of stage S500 is not limited to one situation of stage S510 and stage S520, as long as it can finally obtain the optimal relative position among the detected object, the millimeter wave transmitting antenna 300 and the millimeter wave receiving antenna 400.

The technical features of the above described embodiments can be combined arbitrarily, and for simplicity, not all possible combinations of technical features of the above embodiments are described. However, all the combinations of these technical features, as long as they are not conflictive, should be regarded as being within the scope of this disclosure.

The above embodiments merely express several implementation ways of this disclosure. The description is specific and in detail, but it should not be construed as a limit to this disclosure. It should be noted that, without departing from the spirit of this disclosure, persons skilled in the art can make various modifications or alternatives, which all belong to the scope of this disclosure. Therefore, the technical scope of this disclosure must be determined according to the scope of the accompanying claims.

What is claimed is:

1. A millimeter wave security inspection instrument debugging system configured to debug an imaging definition of a millimeter wave holographic imaging security inspection system, the system comprising:
   a main control apparatus;
   a millimeter wave transmitting antenna;
   a millimeter wave receiving antenna; and
   a machine control apparatus that is configured to change positive positions of the millimeter wave transmitting antenna and the millimeter wave receiving antenna,
   wherein the main control apparatus is electrically connected to the millimeter wave transmitting antenna and to the millimeter wave receiving antenna,
   wherein the millimeter wave transmitting antenna and the millimeter wave receiving antenna are mounted on the machine control apparatus,
   wherein the main control apparatus is configured to generate a millimeter wave detection signal and a reference signal,
   wherein the millimeter wave transmitting antenna, the millimeter wave receiving antenna, and a detected object are respectively located at different relative positions,
   wherein the main control apparatus is configured to perform operations comprising:
      controlling the millimeter wave transmitting antenna to transmit the millimeter wave detection signal to the detected object,
      controlling the millimeter wave receiving antenna to receive an echo signal reflected from the detected object,
      performing, by a processor circuit, a holographic image technique to generate a three-dimensional image based on the reference signal and the echo signal.

2. The system of claim 1, wherein the main control apparatus further comprises a signal processer and a TR assembly,
   wherein the signal processor is electrically connected to the TR assembly,
   wherein the TR assembly is electrically connected to the millimeter wave transmitting antenna and to the millimeter wave receiving antenna respectively,
   wherein the TR assembly is configured to generate the millimeter wave detection signal and the reference signal, to control the millimeter wave transmitting antenna to transmit the millimeter wave detection signal to the detected object, and to control the millimeter wave receiving antenna to receive the echo signal reflected by the detected object, and to process the echo signal, and wherein the signal processer is configured to perform the holographic image technique to generate the three-dimensional image based on the reference signal and the echo signal after the echo signal is processed by the TR assembly.

3. The system of claim 1, wherein the machine control apparatus further comprises an up-and-down control device and a horizontal movement control device, wherein the horizontal movement control device is mounted on the up-and-down control device, and wherein the millimeter wave transmitting antenna or the millimeter wave receiving antenna is mounted on the horizontal movement control device.

4. The system of claim 3, wherein the horizontal movement control device is a guideway shifting platform.

5. A method of controlling a millimeter wave security inspection instrument debugging system, the method comprising:

generating, by a main control apparatus of the system, a millimeter wave detection signal and a reference signal;

transmitting, by a millimeter wave transmitting antenna, the millimeter wave detection signal to a detected object;

receiving, by a millimeter wave receiving antenna, an echo signal reflected by the detected object;

performing, by a processor circuit, a holographic image technique to generate a three-dimensional image based on the reference signal and the echo signal;

determining that one or more of a relative position of the millimeter wave transmitting antenna, the millimeter wave receiving antenna, and the detected object have changed; and performing the transmitting operation based on the determination.

6. The method of claim 5, wherein the operations of determining and performing comprise:

determining that the relative position of the millimeter wave transmitting antenna and the millimeter wave receiving antenna have changed, and performing the transmitting operation based on the determination.

7. The method of claim 6, wherein the operations of determining and performing comprise:

determining that the relative position of the millimeter wave transmitting antenna and the millimeter wave receiving antenna have changed in a horizontal direction, wherein the horizontal direction is perpendicular to a vertical direction;

determining that the relative position of the millimeter wave transmitting antenna and the millimeter wave receiving antenna have changed in the vertical direction;

determining that the millimeter wave transmitting antenna and the millimeter wave receiving antenna are at an optimal relative position in the horizontal direction; and performing the transmitting operation based on the determination.

8. The method of claim 6, wherein the operations of determining and performing comprise:

determining that the relative position of the millimeter wave transmitting antenna and the millimeter wave receiving antenna have changed in a vertical direction;

determining that the relative position of the millimeter wave transmitting antenna and the millimeter wave receiving antenna have changed in a horizontal direction, wherein the horizontal direction is perpendicular to the vertical direction;

determining that the millimeter wave transmitting antenna and the millimeter wave receiving antenna are at an optimal relative position in the vertical direction; and performing the transmitting operation based on the determination.

9. The method of claim 6, wherein the operations of determining and performing comprise:

determining that the relative position of the millimeter wave transmitting antenna and the millimeter wave receiving antenna have changed, determining that the millimeter wave transmitting antenna and the millimeter wave receiving antenna are at an optimal relative position; and performing the transmitting operation based on the determination.

* * * * *